(12) United States Patent
Hilton

(10) Patent No.: US 8,554,379 B2
(45) Date of Patent: Oct. 8, 2013

(54) IRRIGATION SYSTEM AND METHOD FOR OPERATING THEREOF

(75) Inventor: Wendell Gayle Hilton, Zurich (CH)

(73) Assignee: Katharina Arthur Hilton, Zurich (CH)

( * ) Notice: Subject to any disclaimer, the term of this patent is extended or adjusted under 35 U.S.C. 154(b) by 314 days.

(21) Appl. No.: 12/952,228

(22) Filed: Nov. 23, 2010

(65) Prior Publication Data

US 2011/0120564 A1     May 26, 2011

Related U.S. Application Data

(60) Provisional application No. 61/263,855, filed on Nov. 24, 2009.

(51) Int. Cl.
    *G06F 19/00*      (2011.01)
(52) U.S. Cl.
    USPC ............................................. 700/284; 137/2
(58) Field of Classification Search
    USPC .................. 700/16, 284; 137/2, 637
See application file for complete search history.

(56) References Cited

U.S. PATENT DOCUMENTS

| 4,209,131 | A | * | 6/1980 | Barash et al. | 239/68 |
|---|---|---|---|---|---|
| 4,241,375 | A | * | 12/1980 | Ruggles | 361/166 |
| 4,613,547 | A | * | 9/1986 | Wagner et al. | 428/349 |
| 5,048,755 | A | * | 9/1991 | Dodds | 239/64 |
| 5,161,192 | A | * | 11/1992 | Carter et al. | 713/162 |
| 5,740,031 | A | * | 4/1998 | Gagnon | 700/16 |
| 5,839,658 | A | * | 11/1998 | Sarver | 239/1 |
| 6,240,336 | B1 | * | 5/2001 | Brundisini | 700/284 |
| 6,459,959 | B1 | * | 10/2002 | Williams et al. | 700/284 |
| 6,932,277 | B1 | | 8/2005 | Ericksen et al. | |
| 2005/0171646 | A1 | * | 8/2005 | Miller | 700/284 |

* cited by examiner

*Primary Examiner* — Kidest Bahta
(74) *Attorney, Agent, or Firm* — Fleit Gibbons Gutman Bongini Bianco PL; Marty Fleit; Paul D. Bianco

(57) ABSTRACT

The present invention discloses an irrigation system comprising a plurality of valve stations that are operatively coupled with a controller operative to control the operation of the plurality of valve stations. The valve stations are grouped into a plurality of valve station groups, each group comprising at least two valve stations. The at least two valve stations are operatively coupled in parallel with a hotwire to a respective output port of the controller; and the at least two valve stations respective of the plurality of valve station groups are operatively coupled in parallel with a common wire to a corresponding input port of the controller. The controller is operative to change the operational mode of a selected one of the valve stations.

20 Claims, 9 Drawing Sheets

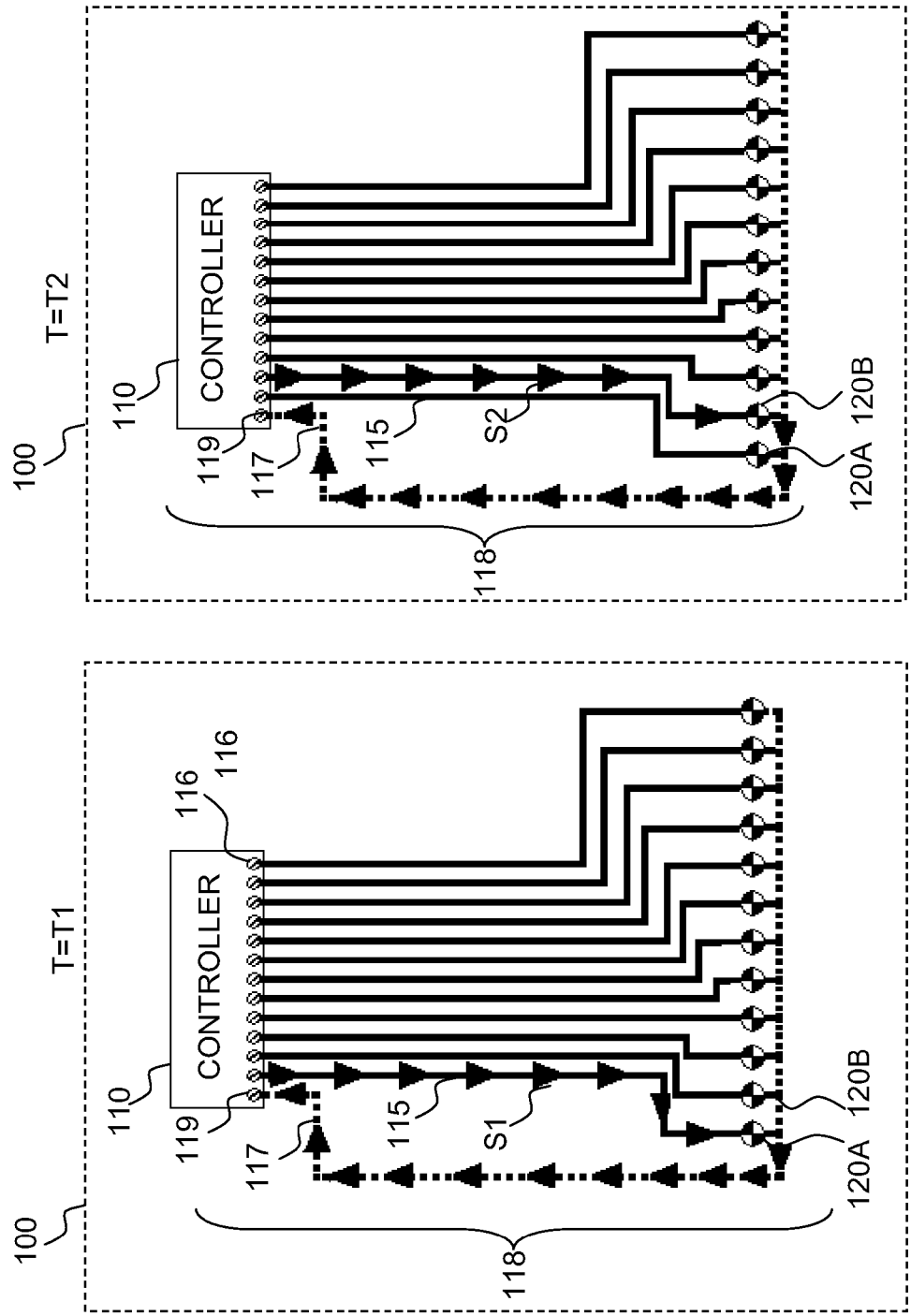

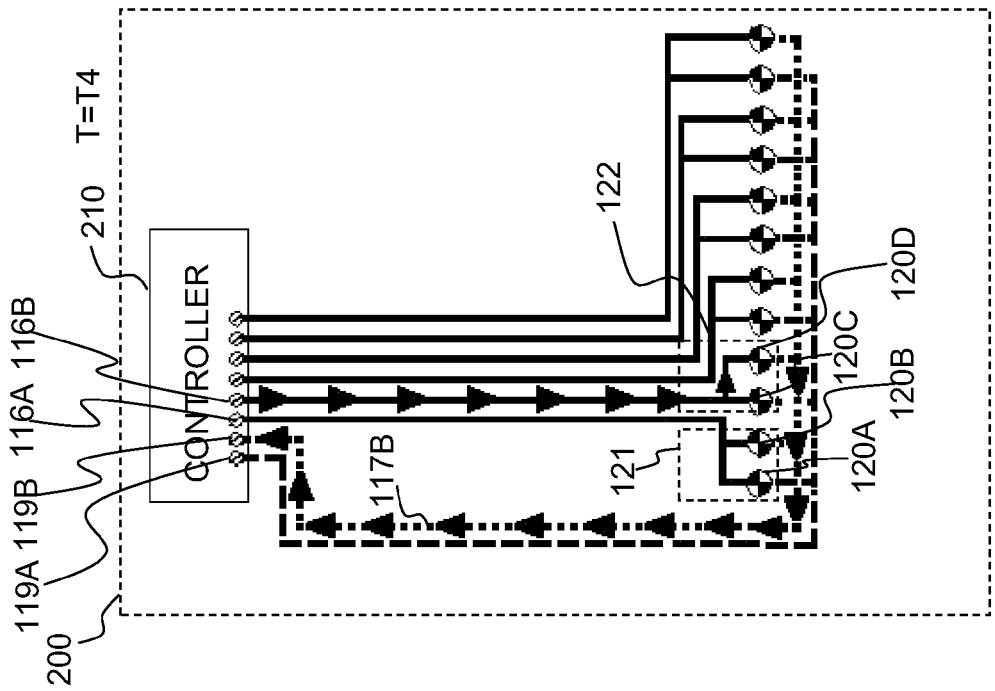
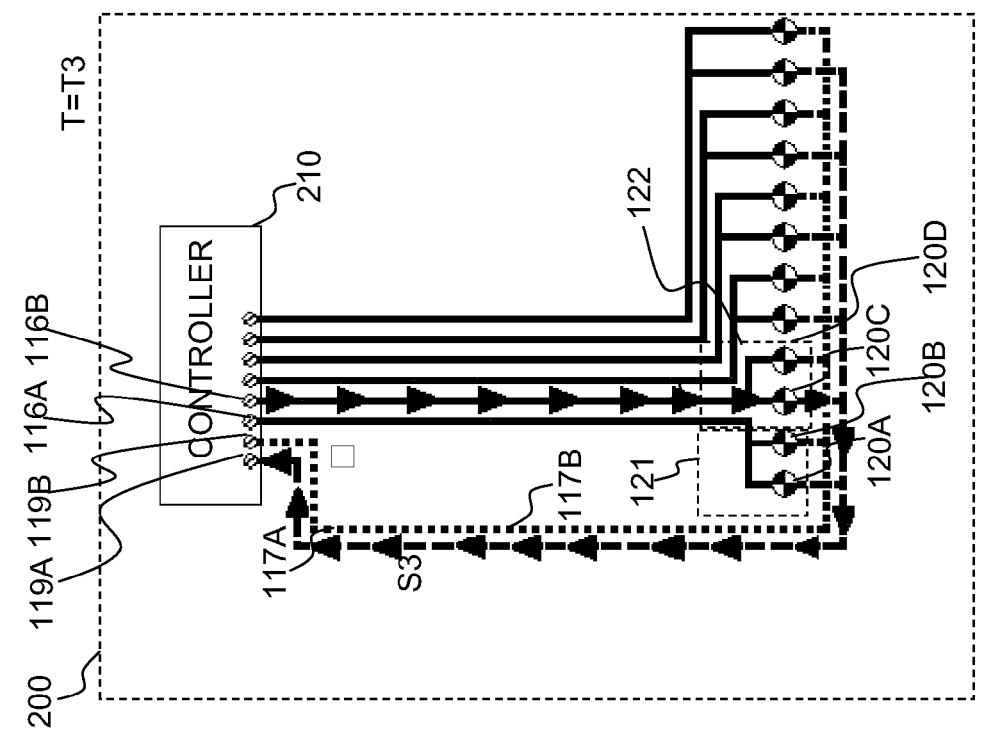

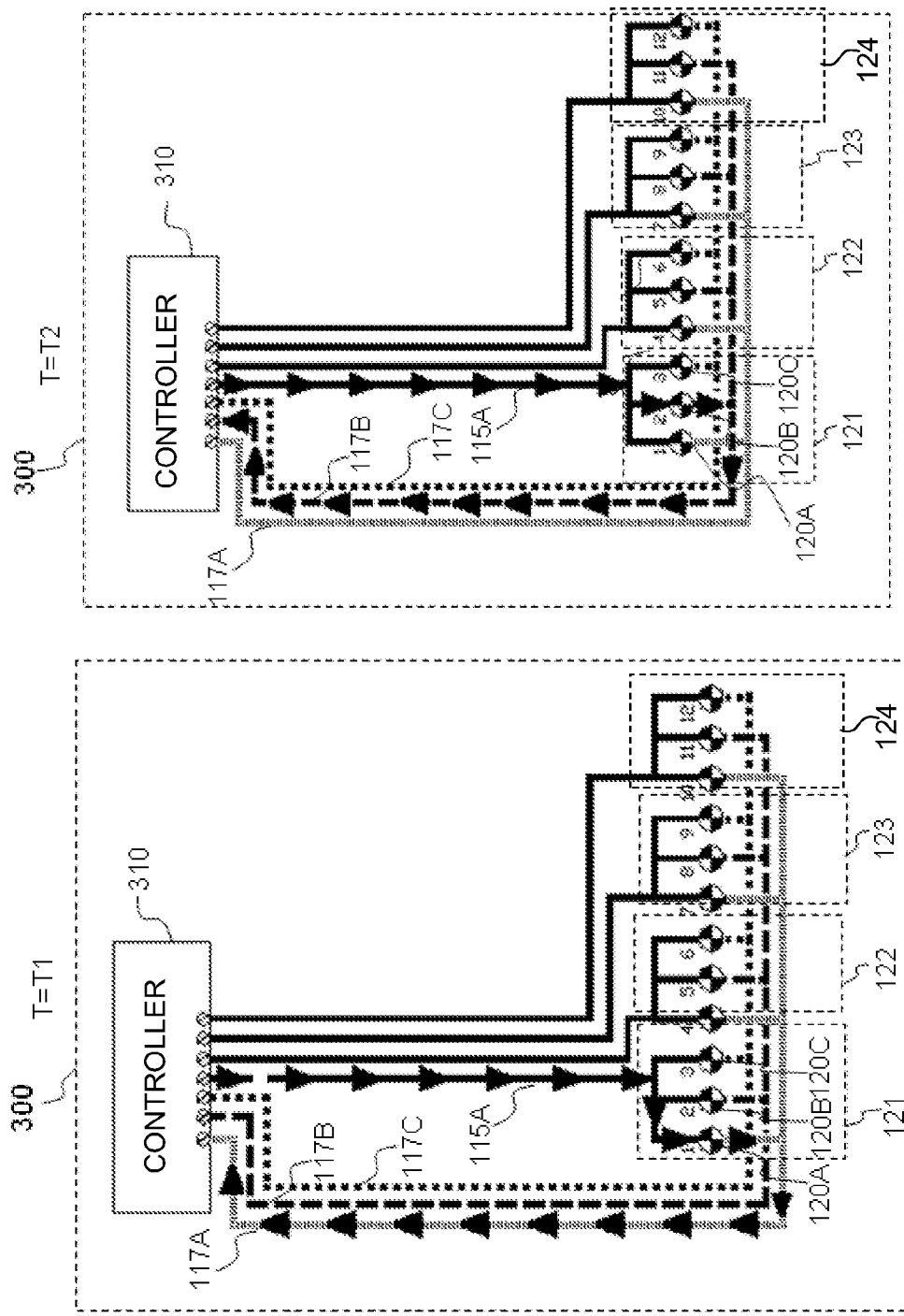

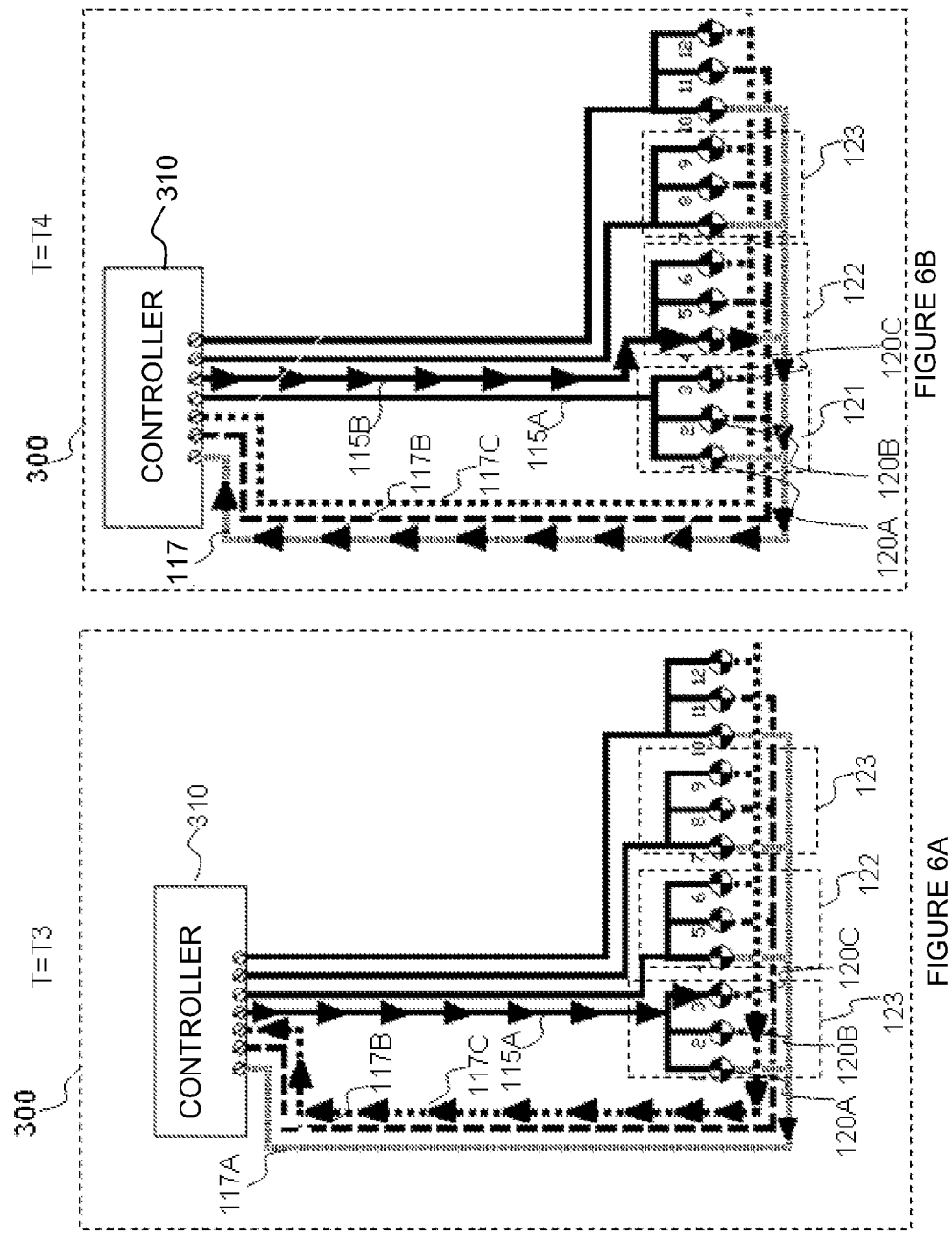

IRRIGATION SYSTEM AND METHOD FOR OPERATING THEREOF

CROSS-REFERENCE TO RELATED APPLICATIONS

This patent application claims priority from U.S. Provisional Patent Application No. 61/263,855 filed on Nov. 24, 2009, the disclosure of which is incorporated herein by reference in its entirety.

FIELD OF INVENTION

The present invention relates to the field of irrigation systems and more particularly, to the control system of irrigation systems.

BRIEF DESCRIPTION OF THE FIGURES

Features of the invention will become more clearly understood in the light of the ensuing description of a some embodiments thereof, given by way of example only, with reference to the accompanying figures, wherein:

FIG. 1A is a schematic block diagram illustration of a first signal flow in a first irrigation system in accordance with the prior art;

FIG. 1B is a schematic block diagram illustration of a second signal flow in the first irrigation system in accordance with the prior art;

FIG. 4A is a schematic block diagram illustration of the second irrigation system according to the embodiment of FIG. 3A, and of a third signal flow therein;

FIG. 4B is a schematic block diagram illustration of the second irrigation system according to the embodiment of FIG. 3A, and of a fourth signal flow therein;

FIG. 5A is a schematic block diagram illustration of a third irrigation system and a first signal flow therein, according to an alternative embodiment of the invention;

FIG. 5B is a schematic block diagram illustration of the third irrigation system according to the alternative embodiment of FIG. 5A, and of a second signal flow therein;

FIG. 6A is a schematic block diagram illustration of the third irrigation system according to the alternative embodiment of FIG. 5A, and of a third signal flow therein;

FIG. 6B is a schematic block diagram illustration of the third irrigation system according to the alternative embodiment of FIG. 5A, and of a fourth signal flow therein;

Figure 2A:
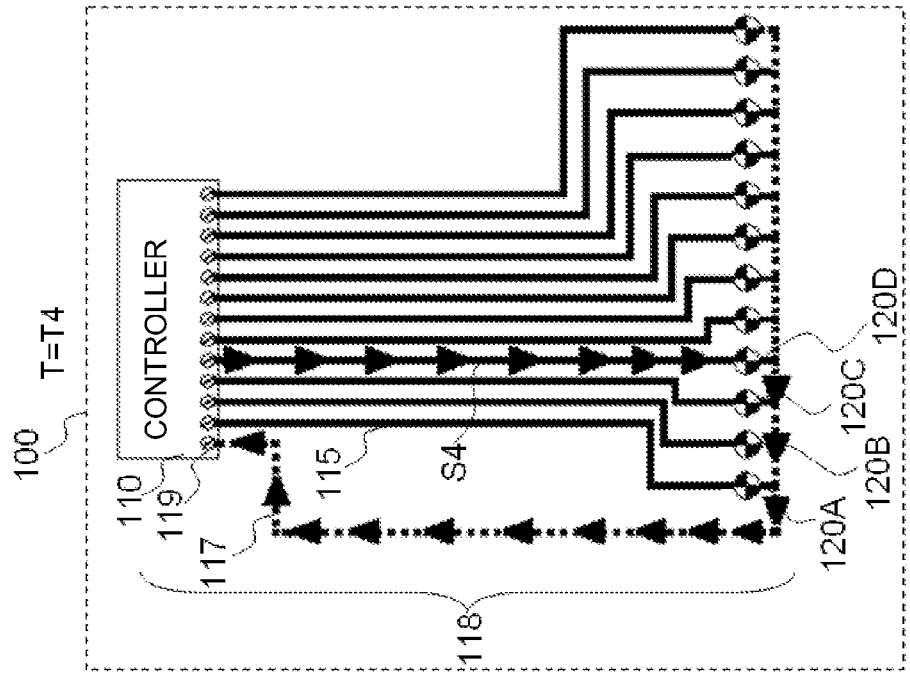
FIG. 2A is a schematic block diagram illustration of a third signal flow in the first irrigation system in accordance with the prior art.
Figure 2B:
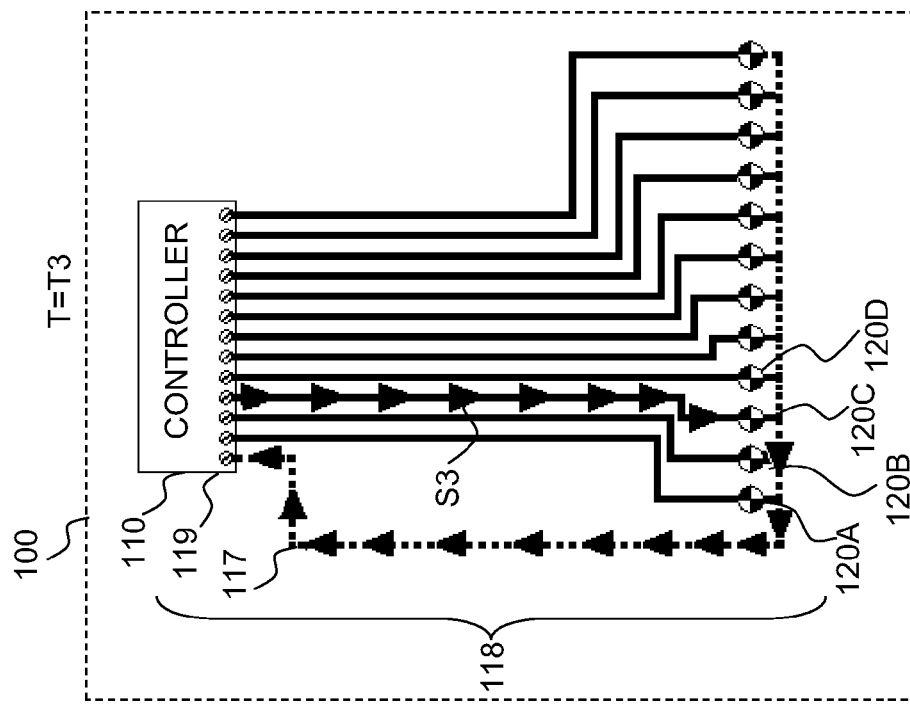
FIG. 2B is a schematic block diagram illustration of a fourth signal flow in the first irrigation system in accordance with the prior art.

The drawings taken with description make apparent to those skilled in the art how the invention may be embodied in practice.

It will be appreciated that for simplicity and clarity of illustration, elements shown in the figures have not necessarily been drawn to scale and may only be illustrated schematically. For example, the dimensions of some of the elements may be exaggerated relative to other elements for clarity. Further, where considered appropriate, reference numerals may be repeated among the figures to indicate identical elements but may not be referenced in the description of all figures.

BACKGROUND OF INVENTION

Irrigations systems employ a plurality of valve stations that are distributed over a large area to be irrigated. Referring to FIG. 1A and FIG. 1B, an irrigation system 100 comprises valve stations 120 each of which is responsively connected with hotwires 115 to output ports 116, respectively, of a controller 110. Further, valve stations 120 are connected via a common wire 117 with an input port 119 of controller 110 to complete a corresponding control circuit 118 of irrigation system 100. Controller 110 controls the operation of valve stations 120 by sending over control circuit 118 a suitable signal over the respective hotwires 115 in accordance with, for example, a timer-function. For example, as is schematically illustrated in FIG. 1A, a first control signal S1 is provided over control circuit 118 at a given time T1 to alter the operational mode of first valve station 120A. Subsequently, (FIG. 1B) at a given time T2, another signal S2 instead of the previous signal S1 is sent over control circuit 118, thereby changing the operational mode of first valve station 120A to its initial mode, whilst subsequently changing the operational mode (e.g., from "close" to "open") of second valve station 120B, and so forth. Similarly, third valve station 120C and fourth valve station 120D are subsequently operated, as is schematically illustrated in FIG. 2C and FIG. 2D. The above-outlined sequence may be performed sequentially for all valve stations 120 of irrigation system 100 in a loop, i.e., each valve station 120 may be addressed at least once during a working cycle.

U.S. Pat. No. 6,932,277, entitled "Sprinkler Valve Wiring Apparatus and Method" discloses an irrigation system comprising a plurality of valves designed to be electrically activated by a control unit. Valve wires extend from the valves to a junction unit. Control unit wires extend from the control unit to the junction unit, and are electrically coupled to the valve wires within the junction unit. The control unit wires include a common wire and a plurality of hot wires. Each hot wire is coupled to a corresponding valve, while the common wire is coupled to all of the valves by the junction unit. The junction unit utilizes resilient blocking members with frangible portions that block unused wire receptacles and can be removed to provide watertight access to the remaining wire receptacles. The junction unit is fixed in place via an anchoring mechanism such as a pipe clip or stake.

DESCRIPTION OF THE INVENTION

Summary of the Embodiments of the Invention

The present invention discloses an irrigation system comprising a plurality of valve stations that are operatively coupled with a controller operative to control the operation of the plurality of valve stations.

According to an embodiment of the invention, the valve stations are grouped into a plurality of valve station groups, each group comprising at least two valve stations.

According to an embodiment of the invention, the at least two valve stations respective of a group are operatively coupled in parallel with a hotwire to a respective output port of the controller.

According to an embodiment of the invention, the at least two valve stations respective of the plurality of valve station groups are operatively coupled in parallel with a common wire to a corresponding input port of the controller.

According to an embodiment of the invention, the controller is operative to change the operational mode of a selected one of the valve stations.

According to an embodiment of the invention, the controller is operative to sequentially change the operational mode of the valve stations, such that during one operation sequence, the operational mode of each of the plurality of valve stations is changed at least once.

According to an embodiment of the invention, the controller is operative to sequentially change the operational mode of the valve stations, such that during one operation cycle, the operational mode of at least one of the plurality of valve stations is changed at least twice.

According to an embodiment of the invention, each of the plurality of valve station groups comprises three valve stations which are coupled in parallel with the output port of the controller and which are coupled in parallel with the common wire with the corresponding input ports.

According to an embodiment of the invention, each of the plurality valve station groups comprises four valve stations which are coupled in parallel with the respective output port of the controller and which are coupled in parallel with the respective common wire to the corresponding input ports.

The present invention further discloses a method for operating an irrigation system according to an embodiment of the invention.

According to an embodiment of the invention, the method comprises selectively addressing a selected one of the output ports respective of a valve station group; and selectively addressing an input port respective of the valve station group.

Detailed Description of the Invention

The above-mentioned irrigation system requires a relatively large number of wires for connecting the valve stations with the controller or computer module.

The present invention discloses an irrigation system that employs a controller (e.g., a computer module, a personal computer, a controller, a processor) that is operatively connected with a plurality of valve stations such to selectively enable their activation and inactivation. The irrigation system comprises a control circuit which includes a plurality of common wires and a plurality of signal hotwires. Each signal hotwire may be operatively coupled with a respective group of at least two valve stations. A plurality of common wires is operatively coupled with the plurality of valve stations of each group, respectively. In addition, each of the plurality of common wires operatively couples in parallel a valve station of different groups with the controller. For example, a first common wire operatively couples a first valve station of each group with the controller, and a second common wire operatively couples a second valve station of each group with the controller. Both the first and the second valve station are operatively coupled with an output port of the controller by a signal hotwire. In some embodiments of the invention, only one output port and only one input port may be responsively coupled with each other at a time. Therefore, only one valve station may be operated at a time.

It should be noted that the phrase "changing the operational mode of a valve station", as well as grammatical variations thereof, includes the procedure of opening a valve station, and the closing of the valve station, i.e., the valve is set from a "closed" to an "open" state, and again to the "closed" state. In an "open" state or mode, water can flow through the valve station into piping for irrigation, whereas in the "closed" state/mode, water is prevented from flowing into piping for irrigation.

It should be noted that the verb "activate" as well as grammatical variations thereof as used herein means changing the operational mode of a valve station.

Figure 3B:
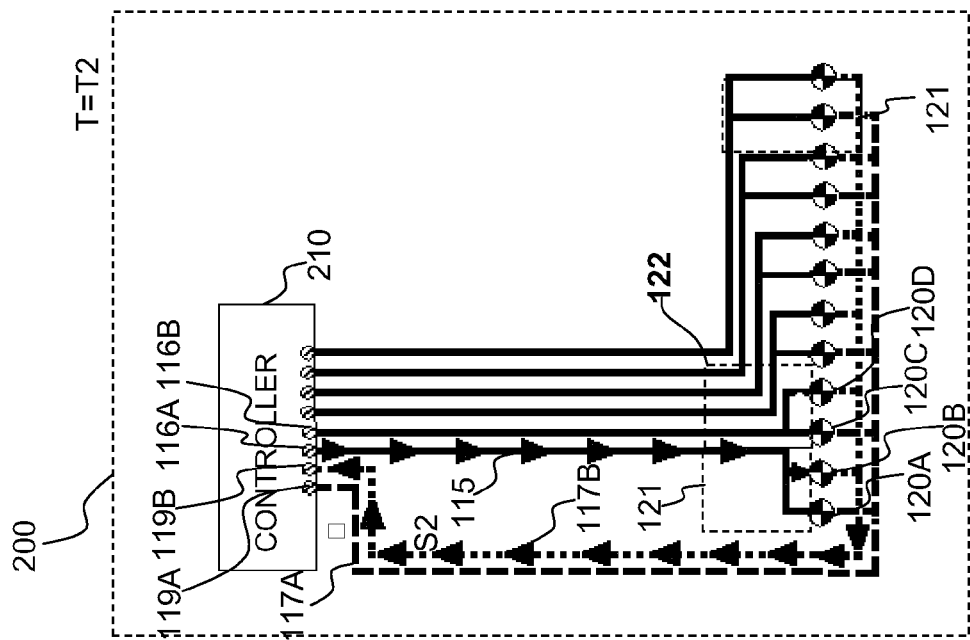
FIG. 3B is a schematic block diagram illustration of the second irrigation system according to the embodiment of FIG. 3A, and of a second signal flow therein.
Figure 3A:
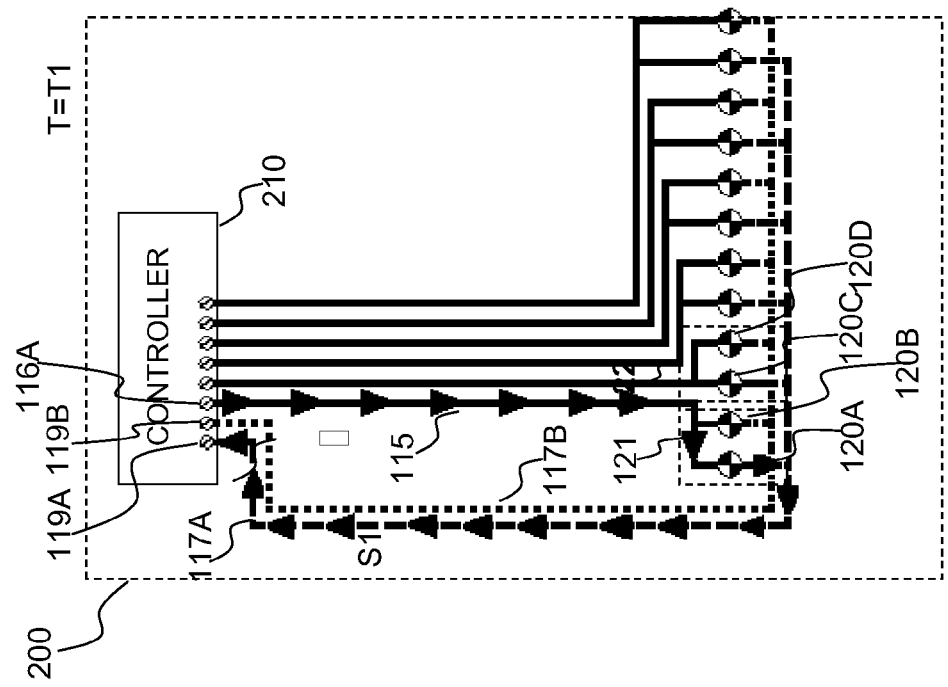
FIG. 3A is a schematic block diagram illustration of a second irrigation system and a first signal flow therein, according to an embodiment of the invention.
Figure 7B:
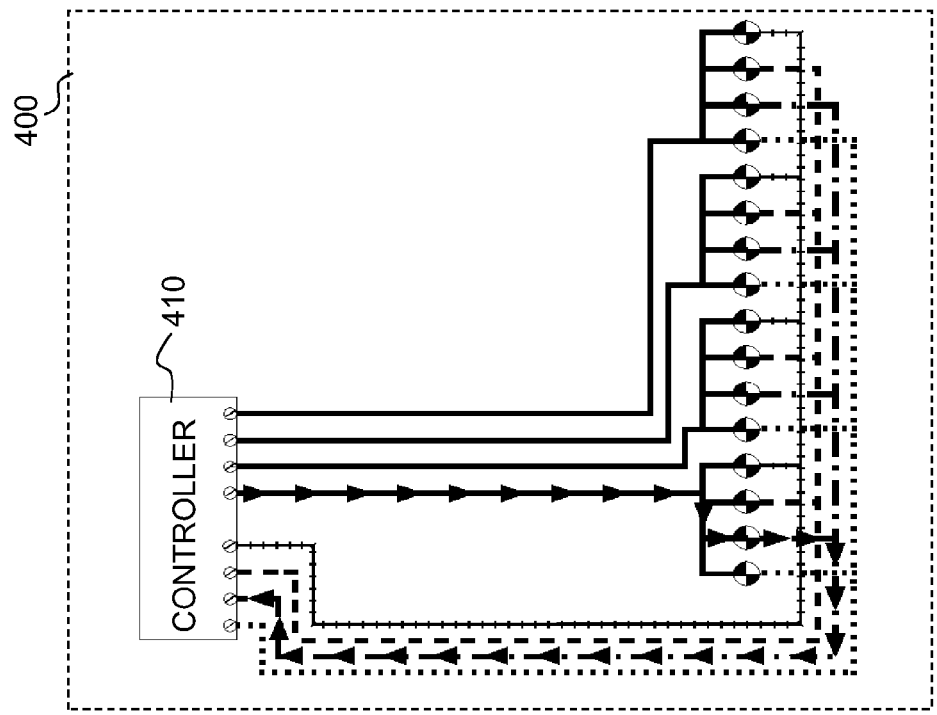
FIG. 7B is a schematic block diagram illustration of the fourth irrigation system according to the embodiment of FIG. 7A, and of a second signal flow therein.
Figure 7A:
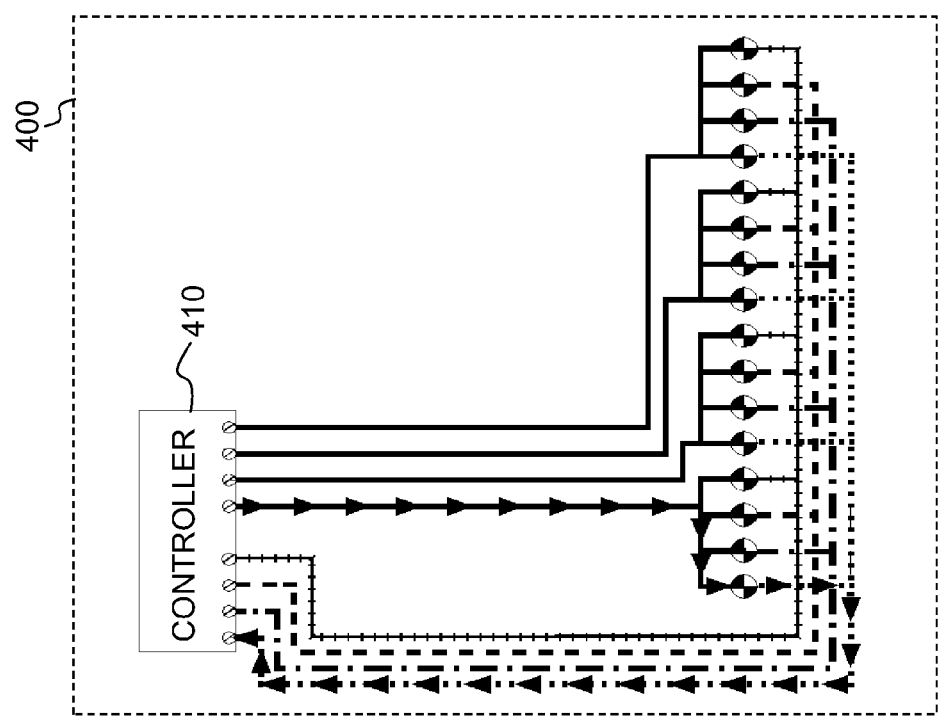
FIG. 7A is a schematic block diagram illustration of a fourth irrigation system according to another embodiment of the invention, and of a first signal flow therein.
Figure 8B:
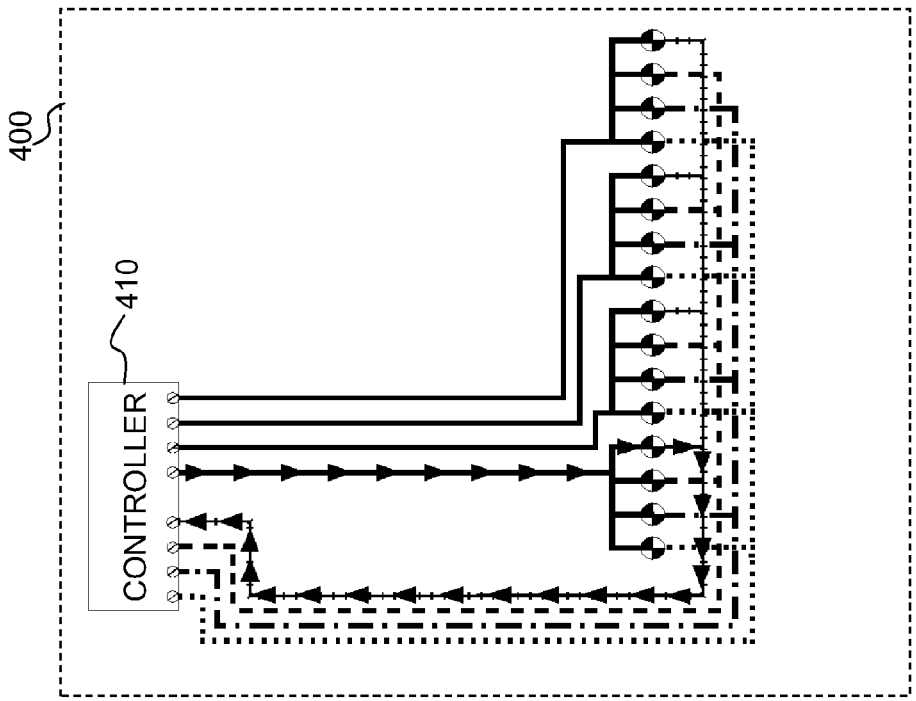
FIG. 8B is a schematic block diagram illustration of the fourth irrigation system according to the embodiment of FIG. 7A, and of a fourth signal flow therein.
Figure 8A:
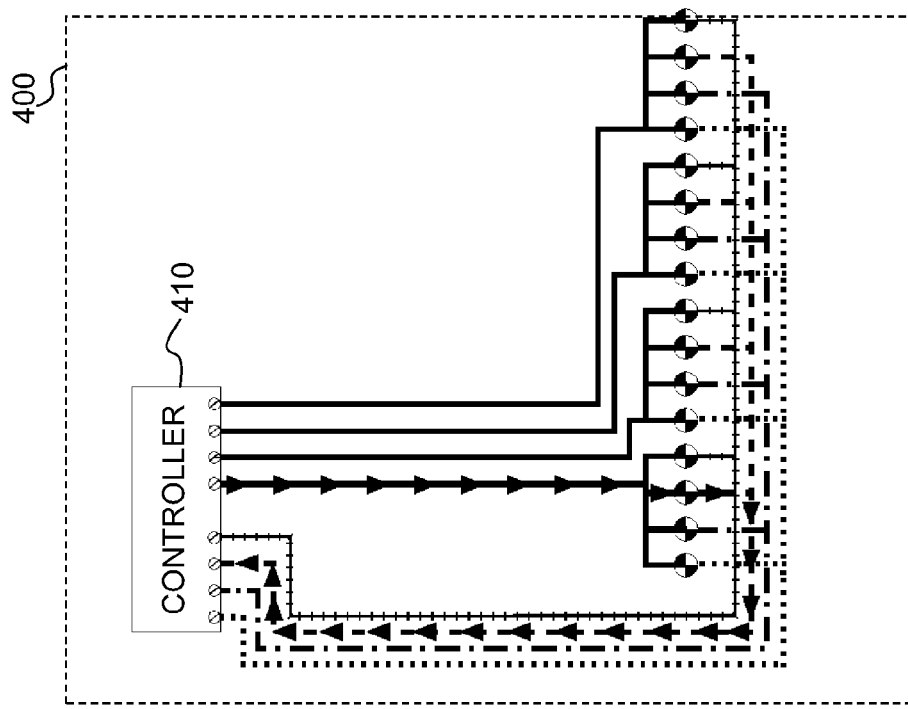
FIG. 8A is a schematic block diagram illustration of the fourth irrigation system according to the embodiment of FIG. 7A, and of a third signal flow therein.
Figure 9:
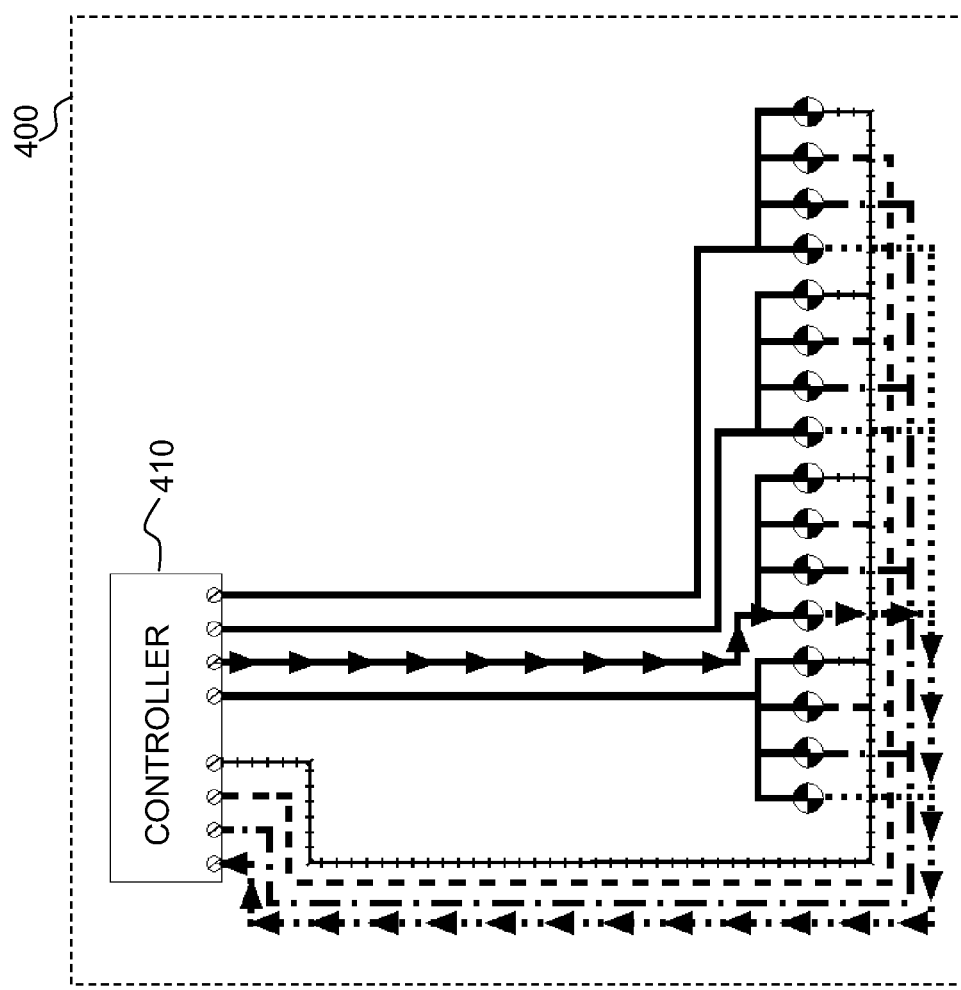
FIG. 9 is a schematic block diagram illustration of the fourth irrigation system according to the embodiment of FIG. 7A, and of a fourth signal flow therein.

Reference is now made to FIG. 2A, FIG. 2B, FIG. 3A and FIG. 3B. According to some embodiments of the invention, an irrigation system 200 comprises a plurality of valve stations 120 that are responsively connected with a controller 210 by hotwires 115 and common wires 117. More specifically, according to some embodiments of the invention, valve stations 120A and 120B of first group 121 are responsively coupled in parallel via a first hotwire 115 with a first output port 116A of controller 210. Further, each valve station of first group 121 is coupled via a respective common wire 117 with respective input ports 119 of controller 210. For example, first valve station 120A of first group 121 and first valve station 120C of second group 122 is coupled with a common wire 117A with input port 119A. Second valve station 120B of first group 121 and second valve station 120D of second group 122 is coupled with input port 119B via common wire 117B. Controller 210 is operative such to activate one valve station 120 at a time. For example, controller 210 may close at time T1 a first circuit between first output port 116A and first input port 119A, thereby causing a change of the operational mode of first valve station 120A. At time T2, a second circuit may be closed between first output port 116A and second input port 119B, thereby causing a change of the operational mode of second valve station 120B. At time T3, a third circuit may be closed between second output port 116B and first input port 119A, thereby causing a change of the operational mode of third valve station 120C, and so forth, as is schematically illustrated in FIG. 3B. Thusly configured, the number of hotwires 115 that have to be deployed between controller 210 and valve stations 120 may be maximal half the number of hotwires 115 required for establishing irrigation system 100. It should be noted that the phrase "changing of operational mode" as used herein may refer to change a valve station from a "closed" to an "open" or vice versa, wherein in an "open" mode" water may flow through the valve station for irrigation, whereas in a "closed" the flow of water through the valve station is blocked.

Reference is now made to FIG. 3A, FIG. 3B, FIG. 4A, and FIG. 4B which schematically illustrate a block diagram illustration of a second irrigation system 300 comprising a controller 310, according to an embodiment of the invention, wherein each output port addresses two valve stations. It should be noted for exemplary purposes only that first group 121 of valve stations 120 may comprise, for example, three valve stations 120. However, the grouping of the valve stations as exemplified herein in any one of the Figures should not be construed as limiting. For example, first group 121 may in some embodiments of the invention comprise four or more valve stations 120 but in any case at least two valve stations 120. At time T1 the first valve station of first group 121 may be activated, subsequently at time T2 the second valve station of first group 121 may be activated, and at a time T3 a third valve station of first group 121 may be activated. Subsequently, at a time T4 a fourth valve station of second group 122 may be activated.

Reference is now made to FIG. 5A, FIG. 5B, FIG. 6A and FIG. 6B.

According to an embodiment of the invention, a third irrigation system 300 may include a controller 310 and a plurality of valve station groups such as, for example, valve stations groups 121, 122, 123, 124, wherein each of the plurality of valve station groups may include three valve stations. Otherwise stated, each output port of controller 310 is operative to address, for example, three valve stations at once. In valve station group 121, the three valve stations are referenced as valve station 120A, 120B and 120C. As is schematically illustrated in the FIGS. 5A, 5B, 6A and 6B, the valve stations may be sequentially operated such to active each valve station once during one operational cycle. However, this should clearly not to be construed as limiting. Accordingly, alternative operation sequences than the one schematically illustrated are implementable by third irrigation system 300. For example, controller 310 may be operative to perform an operational sequence wherein a first valve station is sequentially activated for each valve station group. After the first valve stations respective of each valve station groups have been activated, the operation sequence may be such to then sequentially activate a second valve station of each valve station group, and so forth, until all valve station stations of each valve station groups are activated once, prior to starting the same operational sequence a second time. Second irrigation system 200 may be operated similarly by controller 210. Further alternative sequences are implementable in respective embodiments of the invention.

Reference is now made to FIGS. 7A, 7B, 8A, 8B and 9. A fourth irrigation system 400 according to an embodiment of the invention includes a controller 410 and a plurality of valve station groups, wherein each valve station group comprises four valve stations. In other words, each output port of controller 410 is operative to address four valve stations of the same group at a given time Ti.

It should be noted that the sequence of activation of the valve stations as outlined herein is for exemplary purposes only and not to be construed as limiting. For example, at T1 a second valve station of first group 121, and at T2 a third valve station of a third group 123 may be activated. It should be noted that the term "valve station" as used herein may refer to one or more valve devices operative to selectively provide water to the piping of an irrigation system according to an embodiment of the invention.

While the invention has been described with respect to a limited number of embodiments, these should not be construed as limitations on the scope of the invention, but rather as exemplifications of some of the embodiments. Those skilled in the art will envision other possible variations and modifications that are also within the scope of the invention.

What is claimed is:

1. An irrigation controller for operating a plurality of electrically activatable irrigation valve stations each having first and second electrical pole connectors, the controller comprising:

a first set of a plurality of selectively energizeable electrical ports;

a second set of a plurality of selectively energizeable electrical ports, each of the second set of ports configured to form an electrical circuit when connected with a port of the first set of ports;

an electrical logic circuit configured to selectively energize or deenergize the ports of the first and second set to selectively activate or deactivate a single selected valve station of all electrically connected valve stations, when
  a) the valve stations are electrically arranged in a plurality of groups, each group containing a plurality of valve stations,
  b) the first pole of all valve stations in a group is electrically connected by a wire to a single one of the ports of the first set of ports, each group connected to a unique port of the first set of ports, and
  c) the second pole of each valve station in a group is electrically connected by a wire to a unique port of the second set of ports,
  e) one of the ports of the first set, and one of the ports of the second set, are energized or deenergized to activate or deactivate a selected valve station to thereby starts flow of water or stop of water a flow of water from at least one of the plurality of electrically activatable irrigation valve stations.

2. The controller of claim 1, wherein the controller is operative to sequentially energize and deenergize valves.

3. The controller of claim 1, wherein a valve station contains a plurality of valves activated and deactivated together.

4. The controller of claim 1, wherein the electrical logic circuit is electronic.

5. The controller of claim 1, wherein the electrical logic circuit includes a computer.

6. The controller of claim 1, wherein electrically connected by a wire consists of an electrical connection at the controller, an insulated wire extending to the valve station, and an electrical connection at the valve station.

7. The controller of claim 1, wherein the number of wires required to activate all valve stations is not greater than half of the number of valve stations.

8. The controller of claim 1, wherein there is a only one electrical logic circuit at a single location.

9. The controller of claim 1, wherein the electrical logic circuit includes a timer.

10. An irrigation controller for operating a plurality of electrically activatable irrigation stations each having first and second electrical pole connectors, the controller comprising:

a first set of a plurality of selectively energizeable electrical ports;

a second set of a plurality of selectively energizeable electrical ports, each of the second set of ports configured to form an electrical circuit when connected with a port of the first set of ports;

an electrical logic circuit configured to selectively energize or deenergize the ports of the first and second set to selectively activate a single selected irrigation station of all electrically connected irrigation stations, when
  a) the irrigation stations are electrically arranged in a plurality of groups, each group containing a number of irrigation stations not higher in number than the number of ports in the second set,
  b) the first pole of all irrigation stations in a group is electrically connected to a single one of the ports of the first set of ports, c) each group of irrigation stations is electrically connected to a unique port of the first set of ports, and
d) the second pole of each irrigation station in the group is electrically connected to a unique port of the second set of ports,
e) one of the ports of the first set, and one of the ports of the second set, are energized to thereby start irrigation.

11. The controller of claim 10, wherein an irrigation station contains a plurality of devices activated and deactivated together.

12. The controller of claim 10, wherein an irrigation station includes an irrigation valve which is opened or closed during activation or deactivation, to release or stop the flow of water.

13. The controller of claim 10, wherein the electrical logic circuit is electronic.

14. The controller of claim 10, wherein the poles of the irrigation stations and the ports of the controller are electrically connected by a wire consisting of an electrical connection at the controller, an insulated wire extending to the irrigation station, and an electrical connection at the irrigation station.

15. The controller of claim 10, wherein the number of electrical connections required to activate all irrigation stations is not greater than half of the number of irrigation stations.

16. The controller of claim 10, wherein there is a only one electrical logic circuit at a single location.

17. The controller of claim 10, wherein the electrical logic circuit includes a timer.

18. A method of performing irrigation using a plurality of electrically activatable irrigation valve stations each having first and second electrical pole connectors, the method comprising:

connecting a controller to a plurality of valve stations each opened or closed during activation deactivation to start or stop a flow of water, the controller having
a first set of a plurality of selectively energizeable electrical ports;
a second set of a plurality of selectively energizeable electrical ports, each of the second set of ports configured to form an electrical circuit when connected with a port of the first set of ports;
an electrical logic circuit configured to selectively energize or deenergize the ports of the first and second set to selectively activate or deactivate a single selected valve station of all electrically connected valve stations, when
a) the valve stations are electrically arranged in a plurality of groups, each group containing a plurality of valve stations,
b) the first pole of all valve stations in a group are electrically connected together, and to a unique port of the first set of ports with respect to the first poles of all other groups of valve stations, and
d) the second pole of each valve station in the group is electrically connected by a wire to a unique port of the second set of ports,
e) one of the ports of the first set, and one of the ports of the second set, are energized or deenergized to activate or deactivate a selected valve station to start or stop a flow of water.

19. The method of claim 17, further comprising setting a timer associated with the electrical logic circuit.

20. The method of claim 17, further comprising setting the electrical logic circuit to sequentially activate valve stations.

* * * * *